United States Patent [19]

Obuchi et al.

[11] Patent Number: 5,453,760
[45] Date of Patent: Sep. 26, 1995

[54] POSITION DETECTING APPARATUS

[75] Inventors: Yasuji Obuchi, Nara; Toshiyuki Okunishi, Higashiosaka; Hiromi Abe, Tenri, all of Japan

[73] Assignee: Sharp Kabushiki Kaisha, Osaka, Japan

[21] Appl. No.: 238,142

[22] Filed: May 4, 1994

Related U.S. Application Data

[63] Continuation of Ser. No. 156,674, Nov. 22, 1993, abandoned, which is a continuation of Ser. No. 78,958, Jun. 16, 1993, abandoned, which is a continuation of Ser. No. 782,543, Oct. 25, 1991, abandoned.

[30] Foreign Application Priority Data

Oct. 29, 1990 [JP] Japan ................................ 2-289437
Oct. 29, 1990 [JP] Japan ................................ 2-289437

[51] Int. Cl.$^6$ ................................................ G09G 3/02
[52] U.S. Cl. .................................... 345/173; 178/18
[58] Field of Search ............................. 345/173, 174, 345/175, 178; 178/18, 19; 382/13

[56] References Cited

U.S. PATENT DOCUMENTS

| 4,451,895 | 5/1984 | Sliwkowski | 340/712 |
| 4,686,332 | 8/1987 | Greanias et al. | 178/19 |
| 4,697,244 | 9/1987 | Murakami et al. | 345/173 |
| 4,800,379 | 1/1989 | Yeomans | 340/750 |
| 4,860,372 | 8/1989 | Kuzunuki et al. | 340/708 |

FOREIGN PATENT DOCUMENTS 60-39282 of 1985 Japan.

Primary Examiner—Alvin E. Oberley
Assistant Examiner—Regina Liang
Attorney, Agent, or Firm—David G. Conlin; George W. Neuner; Brian Michaelis

[57] ABSTRACT

A position detecting apparatus is provided with a detecting face so as to detect the positions of points specified on the detection face thereof, which is capable of the detection of the minute position with a detection resolution for the whole detection face being not made finer, because the detection resolution of the region in one portion of the detection face is made finer than the detection resolution of the whole detection face, whereby highly advanced manufacturing art is not required as compared with a case where the detection resolution of the whole detection face has been made finer, thus resulting in lower cost.

3 Claims, 4 Drawing Sheets

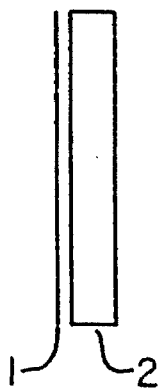
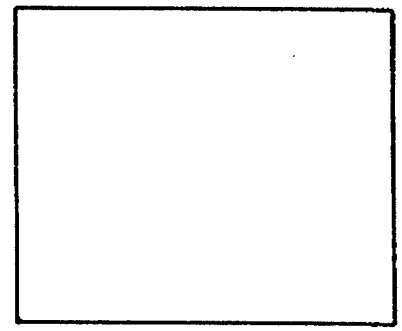
*FIG. 1A*  *FIG. 1B*
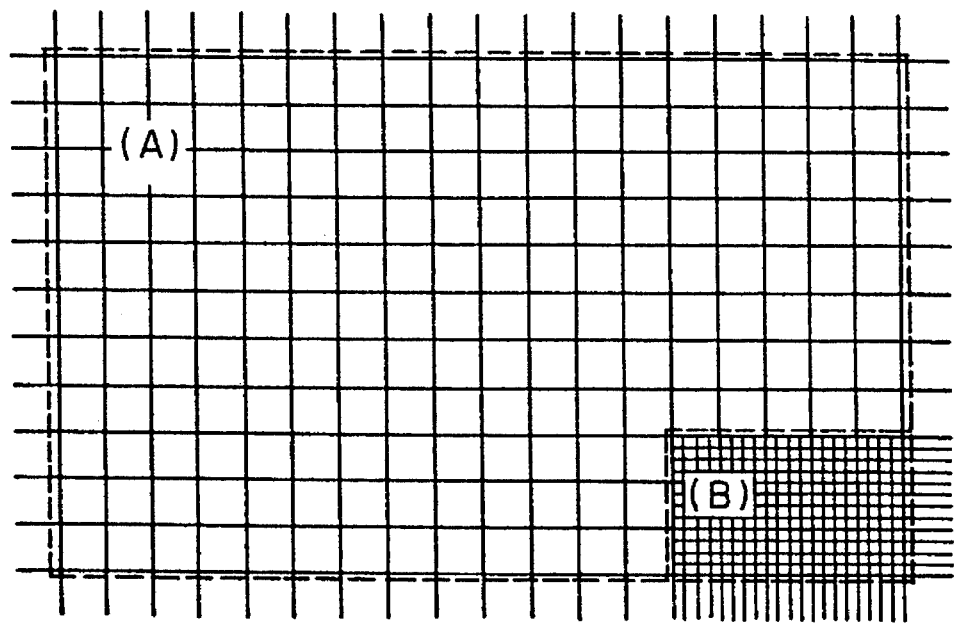
*FIG. 2*

POSITION DETECTING APPARATUS

This is a continuation of application Ser. No. 08/156,674, filed on Nov. 22, 1993, now abandoned, which is a continuation of U.S. Ser. No. 08/078,958, filed on Jun. 16, 1993, now abandoned, which is a continuation of U.S. Ser. No. 07/782,543, filed Oct. 25, 1991, abandoned.

BACKGROUND OF THE INVENTION

The present invention generally relates to a position detecting apparatus which is provided with a detecting face so as to detect the positions of points specified on the detection face thereof.

Because of spread of planar displays such as liquid crystal, EL (electro-luminance) and so on, a display apparatus which is adapted to effect the positional detection on the display has increased in number. Position detecting apparatuses to be used for such display apparatuses are used to indicate the positions on the display face, to effect the recognition inputs of hand written letters, or the like.

Generally the resolution of the position detecting apparatus to be used for indicating positions on the display face is not required enough to be demanded in the recognition inputs of the hand-written letters.

FIGS. 6(a), 6(b) are views showing the conventional position detecting apparatus. The FIG. 6(a) thereof shows a position detecting apparatus of rough resolution and the FIG. 6(b) thereof a position detecting apparatus of close resolution.

The position detecting system of the position detecting apparatus has various ones such as electromagnetic induction system, pressure sensing system, electrostatic system and so on. As they are well known in art and have no direct relation with the present utility mode, sense lines only have only to be drawn.

The position detecting apparatus of FIG. 6(a) is suitable for the position detection of the large area. It is used as a pointing device with, for example, the position detecting apparatus being engaged on the liquid crystal surface face. The position detecting apparatus of FIG. 6(b) is suitable for the position detection of the comparatively small area. It is used for the position detection of higher precision. The position detecting apparatus is often used for, for example, on line letter recognition and so on.

The above described conventional position detecting apparatus has the following defects.

Although the position detecting apparatus of the rough resolution in FIG. 6(a) is suitable for the position detection of the large area, it is difficult to detect the minute positions as in the letter recognition. Although the position detecting apparatus of the fine resolution in FIG. 6(b) is suitable for the detection of the minute position, a lot of sense lines are required, because the area becomes larger to effect the position detection of the large area. Therefore, the highly advanced manufacturing art is required, with a problem that the position detecting apparatus becomes higher in cost.

SUMMARY OF THE INVENTION

Accordingly, the present invention has been developed with a view to substantially eliminating the above discussed drawbacks inherent in the prior art and has for its essential object to provide a position detecting apparatus.

Another important object of the present invention is to provide a position detecting apparatus which is capable of effecting both the detection of large area and the detection of minute positions without requirement of many sense lines.

In accomplishing these and other objects, according to one preferred embodiment of the present invention, there is provided a position detecting apparatus which is provided with a detection face so as to detect the position of a point specified on the detection face thereof, and which is characterized in that the detection resolution in a region of one portion of the above described detection face is finer than the whole detection resolution of the above described detection face.

This invention can be provided with a region specifying means for specifying a region which is the same in area and in shape as the region of the above described fine detection resolution for an optional position on the rough detection face, of the rough detection resolution, from among the above described detection faces, and a position detecting means for detecting the position of a point within a region specified by the above described region specifying means corresponding to the point from the detection results of the position of a point within the region of the above described fine detection resolution.

The position detection of a large area, for example, the detection of the display face position, the specification of the letter positions and so on are effected in the rough detection face of the detection resolution. The detection, in the minute position, of letter recognition and so on is effected in the region on the detection face of the fine detection resolution.

Therefore, the detection of the minute position can be effected with the detection resolution of the whole detection face being not made finer. The highly-advanced manufacturing art is not required, thus resulting in lower cost.

When the position detecting means is provided with the above described region specifying means and position detecting means, the above described region specifying means specifies a region the same in area and in shape as a region of the above described finer detection resolution for an optional position of the detection face, of the rough detection resolution from among the above described detection faces. The above described position detecting means detects the position of a point within a region specified by the above described region specifying means corresponding to the point from the detection results of the position of a point within the region finer in the above described described detection resolution.

Therefore, the position detection of fine resolution may be effected in the whole detection face, and the detection capable of a minute position is not restricted, and the minute position can be detected in the whole detection face.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1(a), 1(b) are whole system view in a case where a position detecting apparatus in a first embodiment of the present invention is combined with a display apparatus;

FIG. 2 is a view showing a detection face of the above described position detecting apparatus;

DETAILED DESCRIPTION OF THE INVENTION

Figure 3:
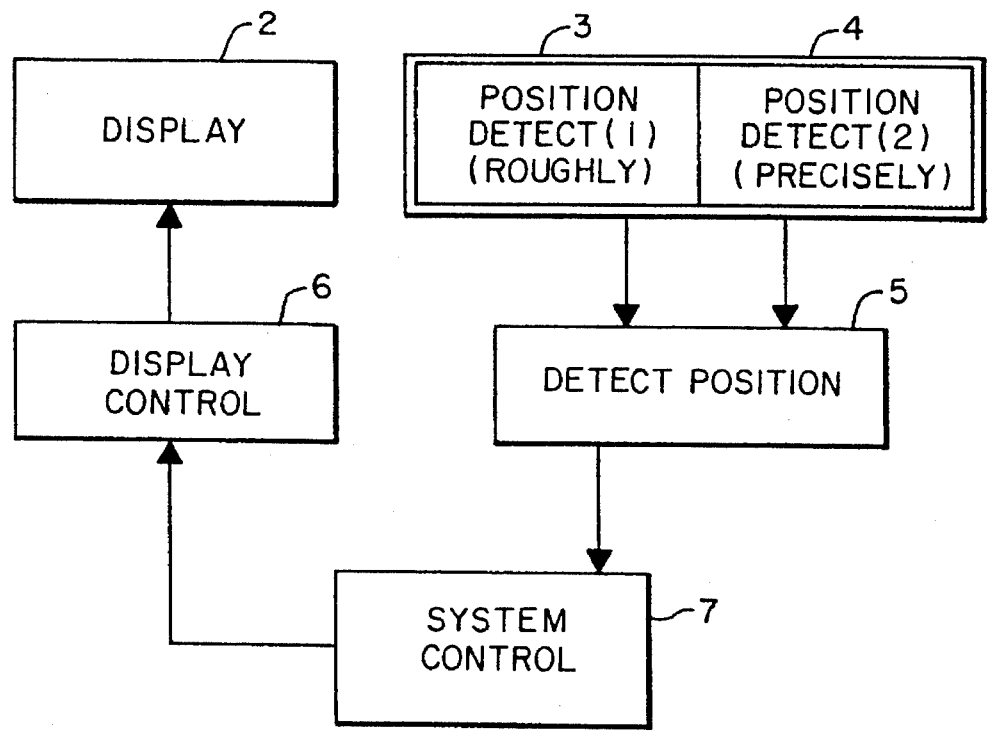
FIG. 3 is a block diagram showing the construction of the above described system.

Before the description of the present invention proceeds, it is to be noted that like parts are designated by like reference numerals throughout the accompanying drawings.

The present invention will be described in detail with reference to the illustrated embodiments.

First Embodiment

FIG. 1 is a view showing the whole system in a case where a position detecting apparatus 1 in the present embodiment is used in combination with a display apparatus 2. FIG. 1(a) is a side view thereof, and FIG. 1(b) is a front face view thereof.

FIG. 2 is a view showing a detection face of the above described position detecting apparatus 1 engaged onto the display picture face (broken line portion).

In FIG. 2, (A) shows, in one portion of the (A), a region of rough resolution covering the whole display face, and (B) shows a region of a fine resolution having sense lines added so as to interpolate the sense lines of the (A).

FIG. 3 is a block diagram showing the construction of the above described system.

In FIG. 3, reference numeral 3 is a position detection portion (1) for detecting the position of a specified point in the above described region (A), reference numeral 4 is a position detecting portion (2) for detecting the position of a specified point in the above described (B), reference numeral 5 is a detection position control portion for controlling the above described two position detecting positions, reference numeral 2 is above described display apparatus, reference numeral 6 is a display control portion for controlling the above described display apparatus, reference numeral 7 is a system control portion for controlling the whole system.

The data of a position detected by the above described position detection portions 3, 4 are transmitted to a display control portion 6 through a system control portion 7. The display control portion 6 controls a display apparatus 2 in accordance with the data.

The system is capable of effecting the position detection of the specification and so on of the letter positions with rough resolution as the whole display picture face, and also, of letter recognition and so on, because of higher detection precision, with the position detection portion (2) of fine resolution in the (B).

The region (B) of fine resolution is provided in one portion of the rough resolution is provided in this manner, so that both the position detection of the large area and the position detection of the minute position can be detected. Highly advanced manufacturing art is not required as compared with a case where the resolution of the whole detection portion is be made finer. Therefore, the realization of the apparatus is easier to effect and the cost thereof becomes lower.

Second Embodiment

Figure 4:
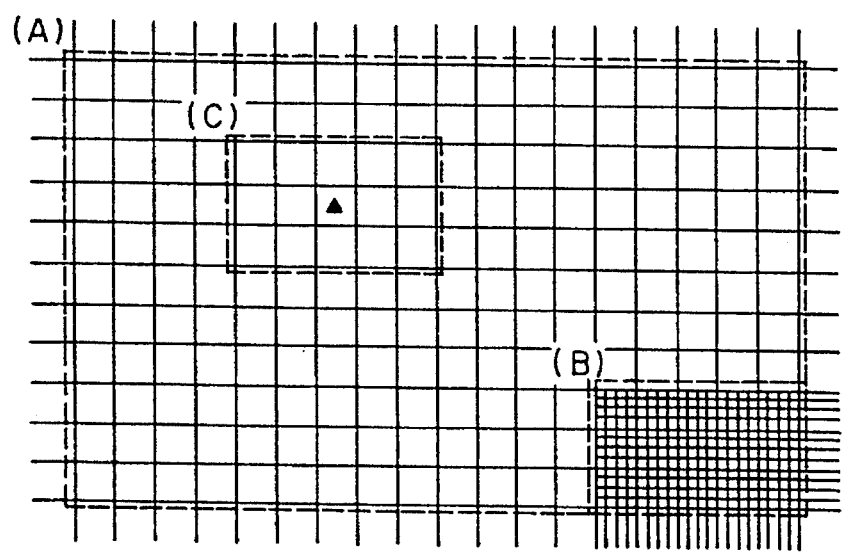
FIG. 4 is a view showing the detection face of a position detecting apparatus in a second embodiment of the present invention.

FIG. 4 is a view showing the detection face of a position detecting apparatus in the present embodiment.

In a case of a position detecting apparatus in a first embodiment, it is possible to effect fine position specification in the region of the (B). But rough position specification only can be effected in the other region, thus restricting the region capable of using for the letter recognition and so on.

The position detecting apparatus in the present embodiment is adapted to effect the position specification, with similar precision to that of the region of the (B), even in the region except for the (B) although the region of fine resolution is restricted to the region of the (B).

A detection position control portion 5 shown in FIG. 3 is provided with a region specifying means for specifying a region (C) the same in area and shape as the (B) region for an operational position in a region except for the (B) region, and a position detecting means for detection the position of a point within the region (C) corresponding to the point from the detection results of the position of a point within the above described (B) region, so that the position detection in the region (C) can be effected with the same precision as that of the region (B).

In order to effect finer position specification near a Δ mark of FIG. 4, specify the region (C) with a point of the Δ mark included in it. Detect the specified position with the position detection portion (1) of the rough resolution. Show the region of the (C) corresponding to the size of the (B) from the detection results on the surface. As the (B) and the (C) can correspond to in the same area, shape on the surface face, the correspondence from the (B) to the (C) may be provided, with the precision of the resolution of the (B), even about the interior thereof. In order to indicate the interior of the temporarily displayed (C) region, the displaying operation may be effected with a cursor or the like as relative positions within the (C) by the positional specification in the region of the (B). As the positional specification within the region of the (B) can be effected with fine resolution, the displaying operation may be effected by controlling a cursor or the like with fine resolution even within the (C), and the positional specification may be effected with fine resolution. Further, as the set position of the (C) can be provided within the whole region of the (A) with the rough resolution, the positional resolution can be effected, within the whole region of the (A), with the fine resolution.

Figure 5:
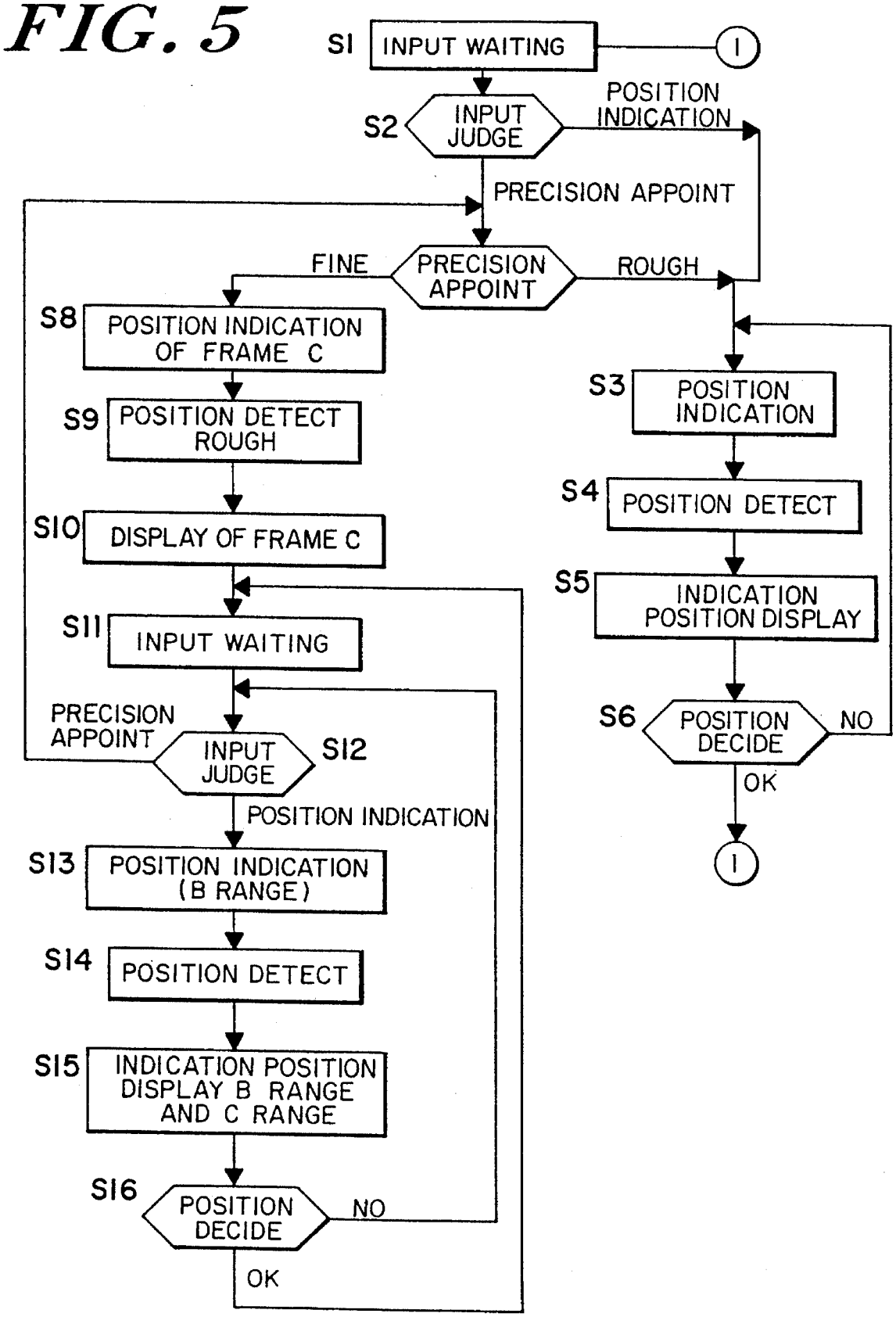
FIG. 5 is a flow chart showing a processing step in the above described second embodiment.
Figure 6A:
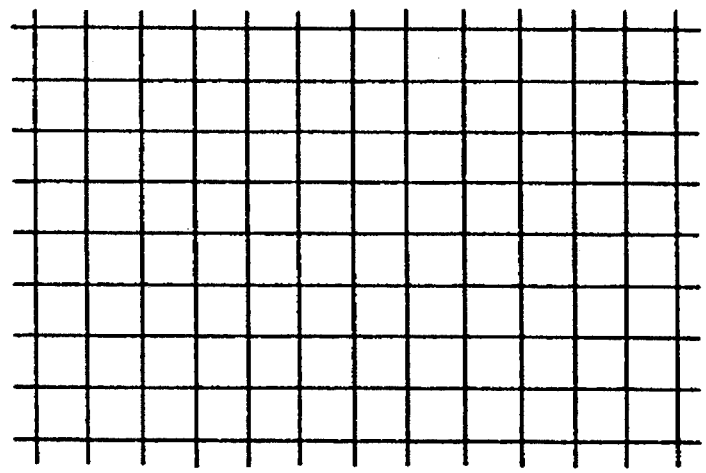
FIGS. 6(a), 6(b) are views showing the conventional position detecting apparatus.
Figure 6B:
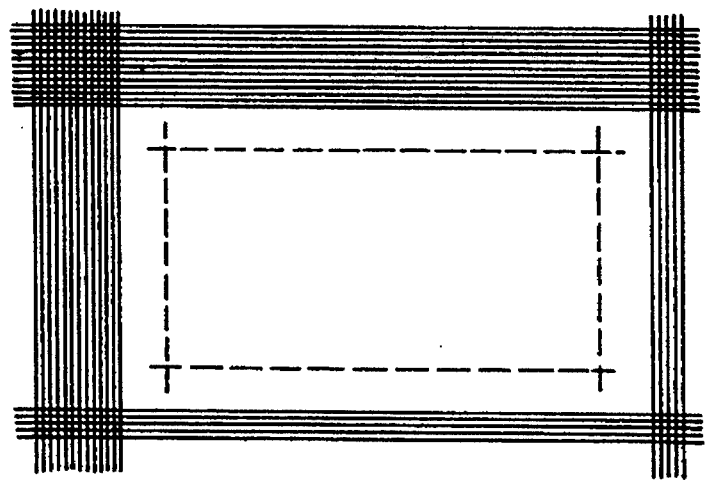

FIG. 5 is a flow chart showing the flow of the above described processing.

At a step S1, the condition is at an input waiting operation. At a step S2, an operator judges whether a position indication should be effected or precision specification should be effected. In order to effect the positional specification, the step advances to a step S3 so as to effect the positional indication. In order to effect the precision specification, the step advances to a step S7 so as to effect the precision specification.

When the positional indication is effected at a step S3, a position indicated at a step S4 is detected, and a position indicated at a step S5 is displayed. The step advances to a step S6. When the indicated position is proper, the position is determined. The step returns to a step S1 so as to wait for the next input. When the indicated position is required to change, the step returns to a step 3 so as to effect the new positional indication.

When the rough precision has been specified at a step S7, the processing of the step S3 and its subsequent is effected. When the fine precision has been specified, the step advances to a step S8 so as to effect the positional indication of a frame (C). At a step S9, the positional detection of the frame (C) is effected at the rough precision. The step advances to a step S10 so as to display the frame (C). At a step S11, the condition is at an input waiting operation. Then, the step advances to a step S12 to judge whether a positional indication should be effected at the fine precision or the specification of the precision should be changed. When the positional indication is required to effect, the step advances to a step S13. When the position indication is effected, the step advances to a step S13. When the precision specification is required to be changed, the step advances to a step S7.

At a step S13, the positional indication in the (B) region is effected. The step advances to a step S14 so as to detect a position indicated in the (B) region and a position in the (C) region corresponding to it. At a step S15, the indicated positions in the (B) region and the (C) region are displayed. The step advances to a step S16. When the indicated position is proper, the positional determination is effected. The step returns to a step S11 so as to wait for the next input. When the indicated position is required to be changed, the step returns to a step S12 so as to effect the new position indication.

The region (C) the same in shape and area as the the (B) region of fine resolution is provided in the region of the rough resolution. By the indication of the position within the region (B), the detection of the position within the region (C) relative to the position thereof is adapted to be effected with the fine precision, so that processing, demanding the fine precision, of graphic inputs and so on can be effected in the whole region (A).

A position detecting apparatus can be used by the side of the display apparatus although both the first and second embodiments show the use of a position detecting apparatus superposed on the display apparatus. Also, the present position detection apparatus only can be used without combination with the display apparatus. Although the region (B) of the fine resolution is set in the right lower portion, it may be set in a different location, instead of this position. Also, the area ratio with respect to the shape of the region (B) and the region (A) can be set in accordance with the use method of the present apparatus without being limited to that of the present embodiment.

As is clear from the foregoing description, according to the arrangement of the present invention, the position detection apparatus of the present invention is capable of the detection of the minute position with the detection resolution of the whole detection face being not made finer, because the detection resolution of the region in one portion of the detection face is made finer than the detection resolution of the whole detection face. Highly advanced manufacturing art is not required as compared with a case where the detection resolution of the whole detection face has been made finer, thus resulting in lower cost.

Also, the position detection apparatus of the present invention is provided with a region specifying means for specifying a region which is the same in area and in shape as the fine region of the above described detection resolution and a position detecting means for detecting a the position of a point within a region specified by the above described region specifying means corresponding to the point from the detection results of the position of a point within the fine region of the above described detection resolution for an optional position on the detection face of the rough detection resolution out of the above described description faces so that the minute position may be specified in the whole detection face without any restriction of the region capable of specifying the minute position to the region of the above described fine detection resolution.

Although the present invention has been fully described by way of example with reference to the accompanying drawings, it is to be noted here that various changes and modifications will be apparent to whose skilled in the art. Therefore, unless otherwise such changes and modifications depart from the scope of the present invention, they should be construed as included therein.

What is claimed is:

1. A position detecting system comprising a position detecting apparatus having a detection face for detecting a position of a specified point and a display apparatus used in combination with said position detecting apparatus, wherein said position detecting apparatus further comprises:
first position detecting means for roughly detecting a position of a specified point on a first region for rough resolution of the position of the specified point on the detection face, said first region being the entire part of the detection face; and
second position detecting means for precisely detecting the position of the specified point in a second region for fine resolution of the position of the specified point on the detection face, said second region being a partial portion of the detection face, the detection resolution in the second region of the detection face being finer than that of the first region, and wherein said display apparatus further comprises:
a display screen corresponding to the entire part of the detection face of said position detecting apparatus;
detection position control means for controlling said first and second position detecting means, said detection position control means comprising a region specifying means for specifying a third region of the detection face having the same area and shape as the second region; and third position detecting means for detecting a position of a point within the third region corresponding to a point from detection results of a position of a point within the second region so that position detection in the third region is effected with the same precise resolution as that of the second region;
display control means for controlling said display apparatus; and
system control means for controlling said position detecting system.

2. The position detecting apparatus as defined in claim 1, wherein the position detecting apparatus and display apparatus are formed integrally as one unit.

3. The position detecting system as claimed in claim 1, wherein data of the positions detected by said first and second position detecting means are transmitted to said display control means by said system control means to control said display apparatus in accordance with the data of the detected positions.

* * * * *